Jan. 8, 1924.

G. W. HIDDLESON

DISPENSING APPARATUS

Filed Oct. 19, 1922   4 Sheets-Sheet 1

1,479,810

INVENTOR
George W. Hiddleson
Byrnes, Stebbins & Parmelee
his attys.

Jan. 8, 1924.
G. W. HIDDLESON
1,479,810
DISPENSING APPARATUS
Filed Oct. 19, 1922    4 Sheets-Sheet 2
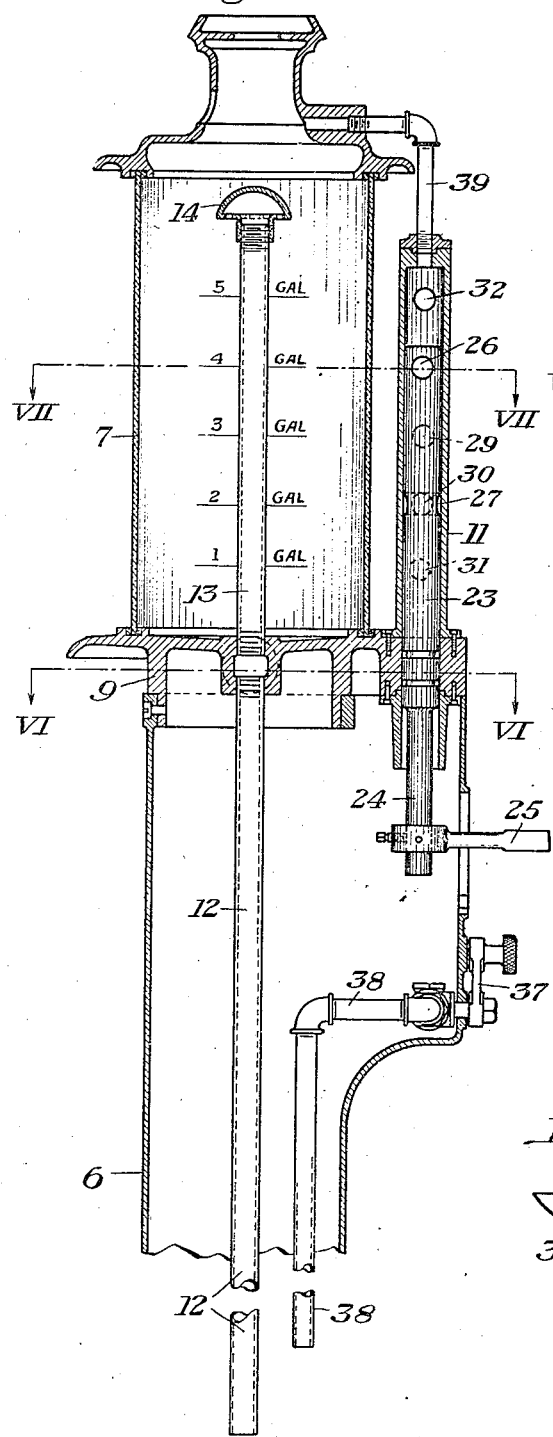
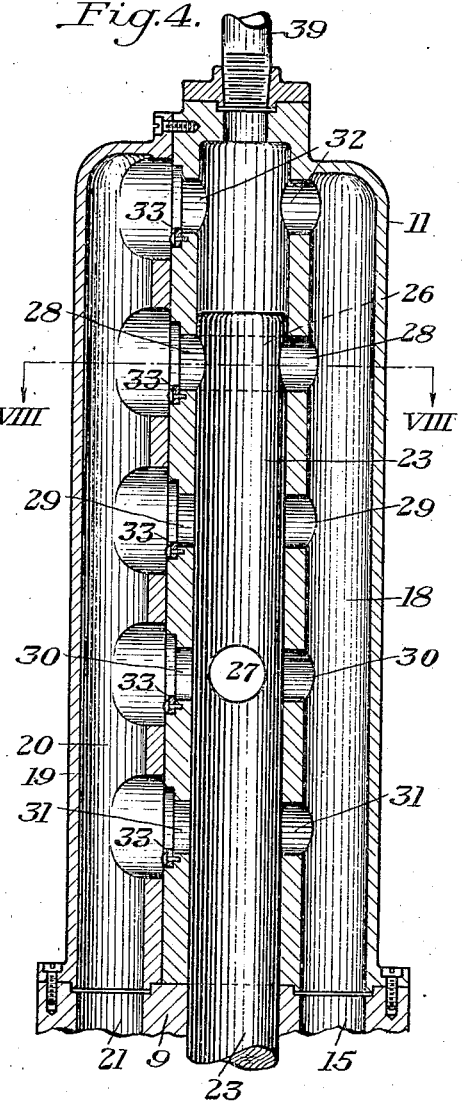
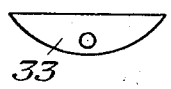
INVENTOR Jan. 8, 1924.

G. W. HIDDLESON

DISPENSING APPARATUS

Filed Oct. 19, 1922

INVENTOR
George W. Hiddleson,
by Byrnes, Stebbins & Parmelee
his Attys.

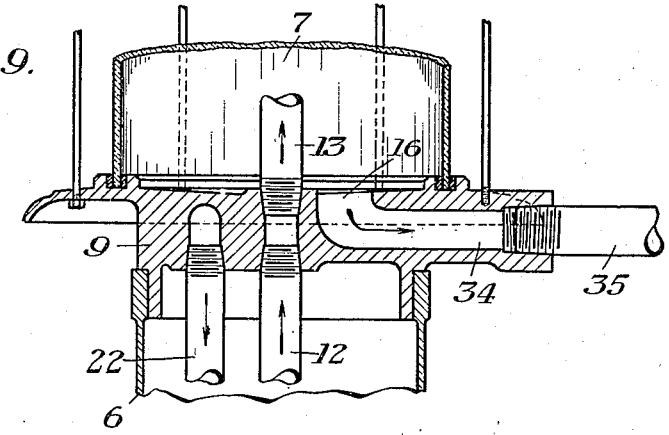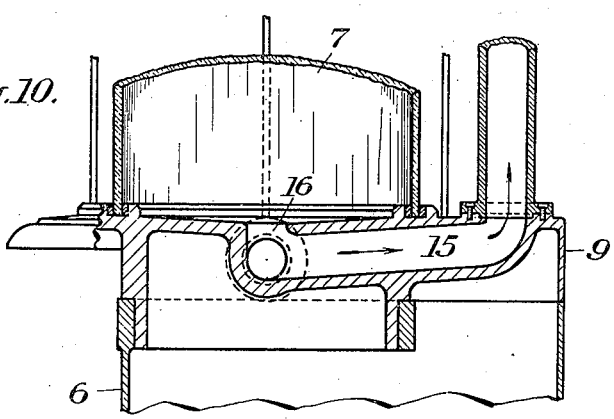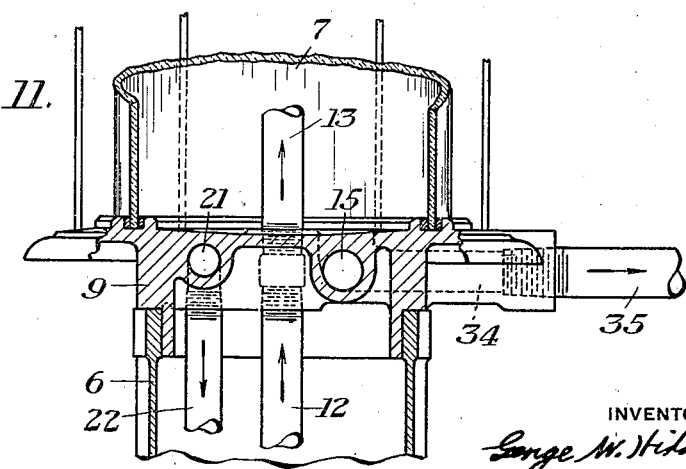

Patented Jan. 8, 1924.

1,479,810

UNITED STATES PATENT OFFICE.

GEORGE W. HIDDLESON, OF BEAVER FALLS, PENNSYLVANIA, ASSIGNOR OF THREE-FOURTHS TO WILLIAM ELMES, OF BEAVER FALLS, PENNSYLVANIA.

DISPENSING APPARATUS.

Application filed October 19, 1922. Serial No. 595,605.

*To all whom it may concern:*

Be it known that I, GEORGE W. HIDDLESON, a citizen of the United States, residing at Beaver Falls, in the county of Beaver and State of Pennsylvania, have invented a new and useful Improvement in Dispensing Apparatus, of which the following is a full, clear, and exact description.

The present invention relates broadly to dispensing apparatus, and more particularly to apparatus of this type particularly adapted for the measuring and dispensing of liquid fuel or fuel oil to automotive vehicles.

It has heretofore been proposed to provide dispensing apparatus having a transparent or visible measuring receptacle provided with overflow means whereby the level therein may be varied as required. Considerable objection to apparatus of this character has been raised for the reason that they are easily "fixed" to deliver short measure to customers with comparatively little fear of detection.

The present invention is directed to an apparatus of the visible measuring type in which means is provided for accurately determining the quantity of fluid delivered and for making it comparatively difficult to impair the accuracy of the apparatus without detection.

In the accompanying drawings there is shown for purposes of illustration only, a preferred embodiment of the present invention, it being understood that the drawings do not define the limits of this invention, as changes in the construction and operation may obviously be made without departing from the spirit or scope of my broader claims.

In the drawings,—

Figure 3 is a vertical sectional view, partly in elevation on the line III—III of Figure 7;

Figure 4 is a detail sectional view of the valve casing;

Figure 5 is a side elevation of one of the gauge pieces;

Figure 9 is a detail sectional view on the line IX—IX of Figure 7;

Figure 10 is a detail sectional view on the line X—X of Figure 7; and

Figure 11 is a detail sectional view on the line XI—XI of Figure 7.

Figure 2:
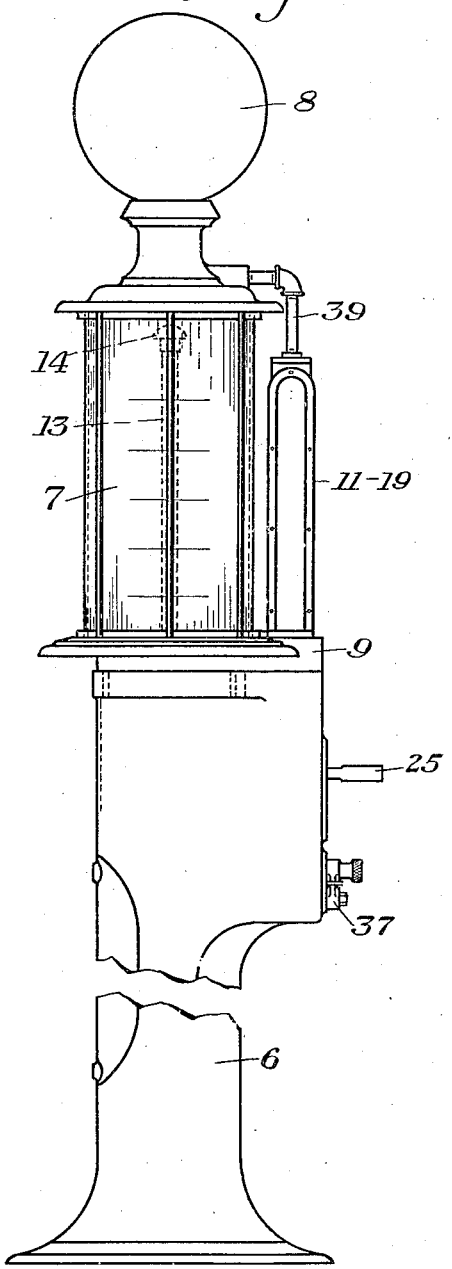
Figure 2 is a side view of the construction shown in Figure 1.

In accordance with the present invention, a suitable form of dispensing apparatus comprises a supporting standard 6 carrying a visible measuring receptacle 7 and an illuminated advertising device 8.

It will be apparent that the device 8 may be omitted or changed as may be desired for any particular installation. Intermediate the standard and the receptacle 7 is a separable base member 9 serving to connect the parts and to provide convenient means for connecting the receptacle 7 with a suitable source of supply, with the delivery hose 10 which supplies a customer, or with the valve casing 11 which determines the liquid level within the receptacle.

Extending upwardly within the standard 6 is a supply pipe 12 having its upper end threaded into the base 9. Also threaded into the base 9 and extending in alignment with the supply pipe 12 is a delivery pipe 13. This pipe preferably extends to a point adjacent the upper end of the receptacle 7 and is supplied with a head 14 serving to spray the liquid downwardly into the receptacle.

Figure 7:
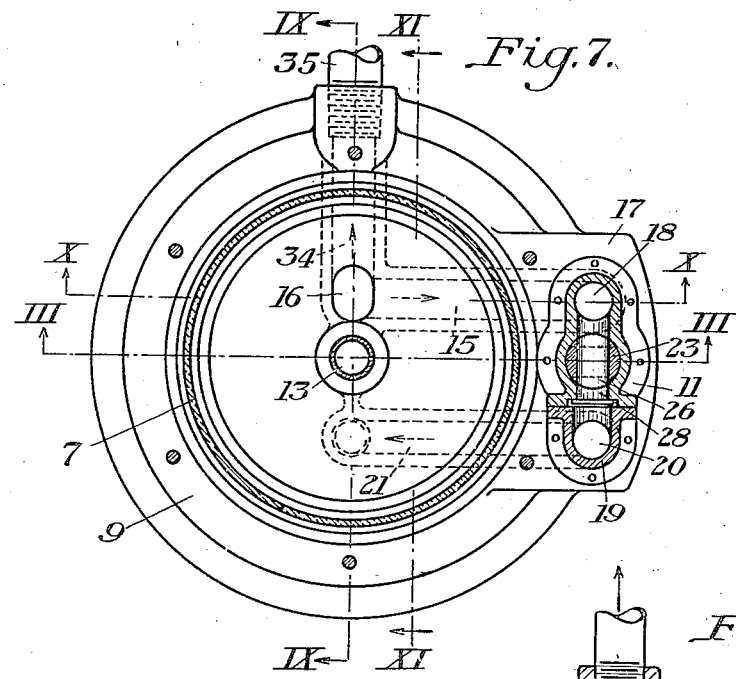
Figure 7 is a transverse sectional view on the line VII—VII of Figure 3.
Figure 6:
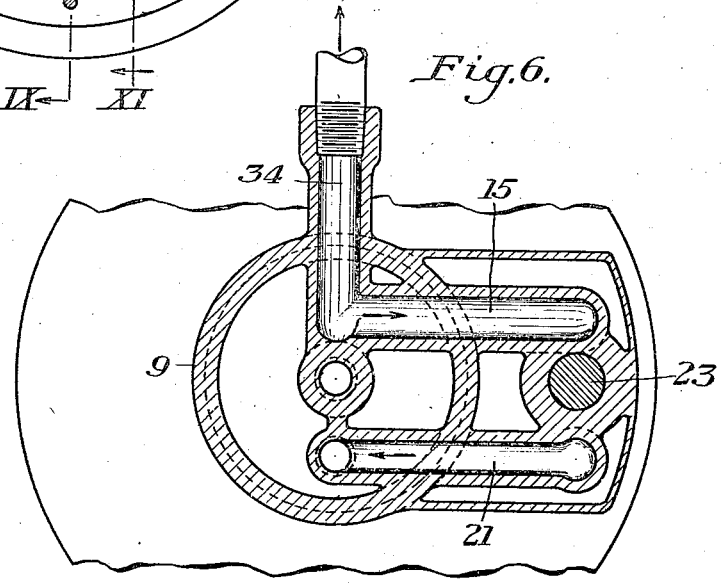
Figure 6 is a transverse sectional view, partly broken away, on the line VI—VI of Figure 3.
Figure 8:
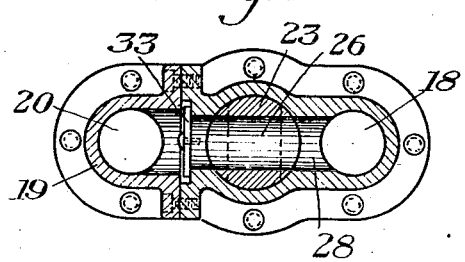
Figure 8 is a transverse sectional view on the line VIII—VIII of Figure 4.

Formed in the base 9 is a channel 15 having an opening 16 directly to the interior of the receptacle 7 at its inner end and having its outer end projected upwardly, as clearly shown in Figure 10, to extend through the upper surface of the base member. The base member at this point is preferably shaped to form a shelf 17 for supporting the valve casing 11. This valve casing, as clearly shown in Figures 4, 7 and 8 is provided with an upwardly extending channel 18 adapted to align at its lower end with the outer open end of the channel 15. The casing also comprises a removable cover 19 which is hollow to provide an overflow channel 20. This channel, when the parts are in operative assembled position, communicates at its lower end with the outer open end of a return channel 21 formed in the base 9 and leading to a return pipe 22, as shown in Figures 9 and 11.

For controlling communication between the supply channel 18 and the overflow channel 20 in the valve casing, there is provided a cylindrical valve 23 which is adapted to have a limited vertical movement and a limited rotary movement. This movement may be accomplished by extending the lower end of the valve downwardly to form a stem 24 to which is attached an operating handle 25. This handle is adapted to be moved into any one of a number of selective slots designated, respectively, 1, 2, 3, 4 and 5 in Figure 1 for determining the fuel level in the receptacle 7. The valve 23 is provided adjacent its upper end with an opening 26 and adjacent its intermediate portion with an opening 27. The opening 26 is adapted to establish communication by way of ports 28 or 29 between the channels 18 and 20, while the opening 27 is adapted to similarly establish communication between these channels by way of the ports 30 or 31.

Figure 1:
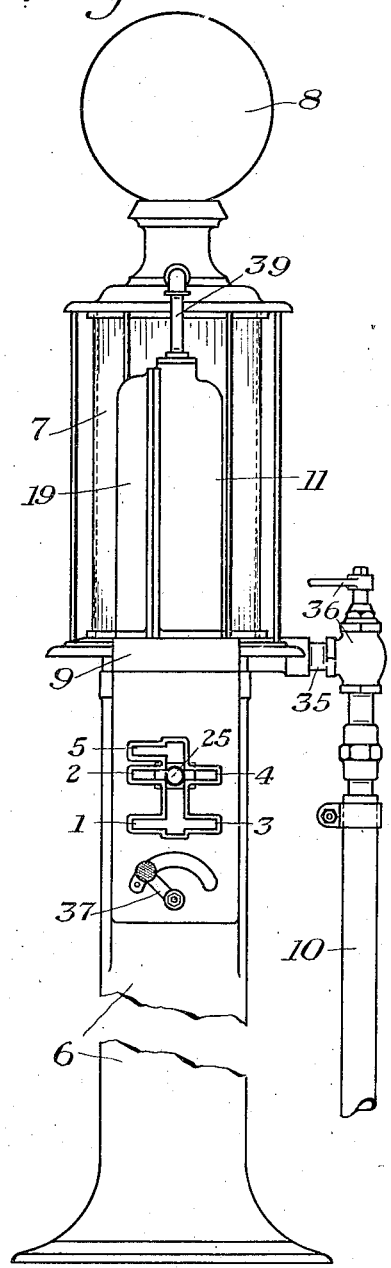
Figure 1 is a front elevation of an apparatus constructed in accordance with the present invention.

If it is desired to supply, for example, four gallons of fuel, fuel oil or the like to a customer, the valve 23 will be moved into the position illustrated in Figures 3 and 4 with the handle 25 in the slot indicated 4 in Figure 1. This will bring the opening 26 into registration with the ports 28 whereby the liquid which is rising in the channel 18 will flow through the ports 28 into the channel 20 and thus pass to the return pipe 22. With the valve in this position, it will be impossible to raise the level of the liquid in the receptacle 7 above the four gallon mark. In like manner, by movement of the operating handle 25 to different positions, it will be apparent that other liquid levels may be obtained. For measuring five gallons, the liquid flows through the ports 32 over the upper end of the valve 23. In order to accurately fix these levels, there are provided separate gauge pieces 33 which are accurately machined and then placed in position within their respective ports so that extreme accuracy is possible. After the gauge pieces are in position the cover 19 is applied and the entire valve casing is painted. Thereafter, if the fastening means for the valve casing cover are removed, this fact will be easily detected by reason of the fracture of the paint or of the sealing means which may be provided for the fastening devices. This makes it comparatively easy to detect whether the apparatus has been tampered with in such manner that it will deliver short measure.

For delivering the liquid from the receptacle 7 to the customer, the base 9 is formed with a channel 34 communicating at its inner end with the opening 16 and at its outer end with a pipe 35 leading to the hose 10. This connection may be controlled by a valve 36 whereby, when the desired level has been obtained in the receptacle 7, the valve 36 may be opened to permit the liquid to flow through the hose.

It will be understood that the supply pipe 12 leads from a suitable source of supply, such for example as an underground tank, as is customary in this art, and that the return pipe 12 may redeliver either to this or to another tank. If the tank is below the level of the receptacle 7, delivery may be effected by air under pressure as is customary. In such cases the standard 6 may be supplied with a valve 37 controlling the passage of air through a line 38 leading to the supply tank.

The present apparatus provides an extremely accurate dispensing device which is attractive in appearance and which is so constructed that it is easily operated and unlikely to get out of working order. To prevent the accumulation of pressure in the valve casing there may, if desired, be provided an equalizing connection 39 with the interior of the receptacle 7.

The advantages of the present invention arise from the construction provided whereby accuracy of measurement is insured and the possibility of tampering without detection is decreased.

I claim:

1. In a dispensing apparatus, a measuring receptacle, a valve casing cooperating with said receptacle, means in said casing for controlling the liquid level in said receptacle, and means for initially supplying the liquid to be measured to said receptacle, there being a communicating channel between said receptace and casing and an overflow channel in said casing, substantially as described.

2. In a dispensing apparatus, a measuring receptacle, a valve casing cooperating with said receptacle, there being a communicating channel between said receptacle and casing, an overflow channel in said casing, and a vertically and rotatably mounted valve in said casing adapted to variably establish communication between said channels for determining the liquid level in said receptacle, substantially as described.

3. In a dispensing apparatus, a measuring receptacle, a valve casing cooperating with said receptacle, there being a communicating channel between said receptacle and casing, an overflow channel in said casing, and a valve in said casing adapted to variably establish communication between said channels for determining the liquid level in said receptacle, substantially as described.

4. In a dispensing apparatus, a measuring receptacle, a valve casing cooperating with said receptacle, there being a communicating channel between said receptacle and casing, an overflow channel in said casing, a valve in said casing adapted to variably establish communication between said channels for determining the liquid level in said receptacle, and removable gauge pieces in said casing and cooperating with said valve, substantially as described.

5. In a dispensing apparatus, a measuring receptacle, a valve casing cooperating with said receptacle, there being a communicating channel between said receptacle and casing, an overflow channel in said casing, a valve in said casing adapted to variably establish communication between said channels for determining the liquid level in said receptacle, and means independent of the valve for accurately determining the liquid level in said receptacle, substantially as described.

6. In a dispensing apparatus, a measuring receptacle, a valve casing cooperating with said receptacle, there being a communicating channel between said receptacle and casing, an overflow channel in said casing, a valve in said casing adapted to variably establish communication between said channels for determining the liquid level in said receptacle, and removable gauge pieces cooperating with said valve, said casing comprising a cover permitting access to said gauge pieces, substantially as described.

7. In a dispensing apparatus, a measuring receptacle, a valve casing cooperating with said receptacle, there being a communicating channel between said receptacle and casing, an overflow channel in said casing, a valve in said casing adapted to variably establish communication between said channels for determining the liquid level in said receptacle, and removable gauge pieces cooperating with said valve, said casing comprising a cover permitting access to said gauge pieces, and having fastening means so positioned that removal of the cover may be detected, substantially as described.

8. In a dispensing apparatus, a supporting standard, a receptacle carried thereby, a base member intermediate said standard and receptacle, a valve casing supported by said base member, means in said casing for determining the liquid level in said receptacle, said base member being provided with channels establishing communication between said receptacle and said casing, and means for supplying liquid to said receptacle, substantially as described.

In testimony whereof I have hereunto set my hand.

GEORGE W. HIDDLESON.